2,946,255

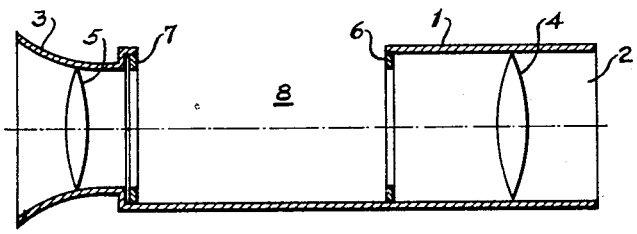
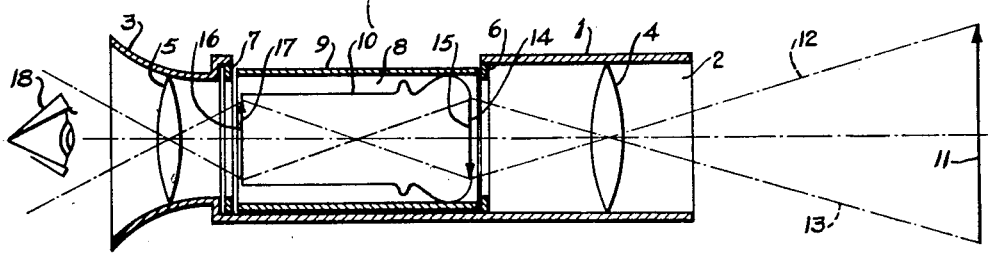
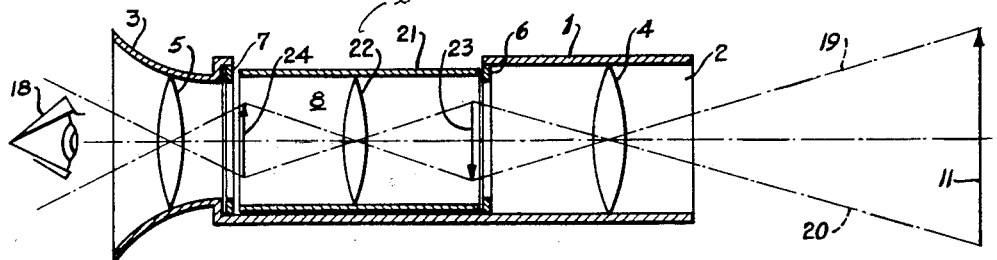

COMBINED DAY AND NIGHT VIEWING DEVICE

Errol Bolay, Waldegg (Uitikon), Switzerland, assignor to Albiswerk Zurich, A.G., Zurich, Switzerland, a corporation of Switzerland Filed Apr. 30, 1956, Ser. No. 581,718

Claims priority, application Switzerland June 2, 1955

2 Claims. (Cl. 88—1)

This invention relates to apparatus for viewing distant objects and more particularly relates to apparatus utilizing selectively visible or infrared radiation emitted by or reflected from distant objects.

Infrared distant viewing devices are well-known, utilizing emitted or reflected infrared rays from distant objects and comprising an objective lens for forming an infrared image of the object upon the infrared-sensitive cathode of an image converter. The image converter, in turn, converts the infrared image into a visible image. In most cases, an ocular lens is provided through which the eye of an observer views the visible image, magnified by the ocular lens.

Both the objective and ocular lenses are mostly high quality composite optical systems and, therefore, it would be advantageous to utilize the same device for viewing in visible radiation in the daytime as well as in infrared radiation at night, instead of requiring two separate devices as hitherto necessary.

It is an object, therefore, of the present invention to provide an improved viewing apparatus which is selectively operable with visible or infrared radiation and, therefore, can be used in daylight or at night.

In accordance with the present invention, there is provided viewing apparatus selectively operable with visible or infrared radiation, comprising a first tubular means with an objective lens and an ocular lens located near opposite ends of the tubular means, and this tubular means is provided with an axially extending opening, located between the aforesaid lenses. There are also provided second tubular means supporting an infrared image converter, and third tubular means supporting a third optical lens. The second and third tubular means are adapted to be selectively inserted in the aforesaid opening in alignment with the objective and ocular lenses.

For a better understanding of the invention, together with other and further objects thereof, reference is had to the following description, taken in connection with the accompanying drawing, and its scope will be pointed out in the appended claims.

In the accompanying drawing, Fig. 1 schematically shows the basic unit of the device, while Fig. 2 shows the device with an infrared image converter inserted for night operation, and Fig. 3 illustrates the device with an optical lens inserted for daytime operation.

Referring now more particularly to Fig. 1, there is shown tubular means indicated at 1 and 3, having an opening at 2 towards the object to be viewed, while tubular portion 3 is placed close to the eye of an observer. There are also provided an objective lens 4 and an ocular lens 5, each schematically illustrated as a single lens only. In practice, multiple lens systems can be used in accordance with good optical design. For insertion of second and third tubular means, as explained later, the basic unit, indicated at 1 and 3, is provided with an opening generally indicated at 8, at the ends of which there are provided gaskets 6 and 7, whose function is explained below.

Fig. 2 shows the unit of Fig. 1 with a second tubular means 9 inserted in opening 8. Tubular means 9 fits against gaskets 6 and 7 in order to make the device light-tight, as is conventional practice. An infrared image converter 10 is supported in tubular means 9 and is provided with an infrared cathode 15 and a fluorescent screen 17.

Fig. 3 illustrates the device for daytime operation, whereby the second tubular means 9 with infrared image converter 10 is replaced by a third tubular means 21 supporting an optical lens 22.

In operation of the arrangement of Fig. 2, infrared radiation indicated by rays 12 and 13, emitted by or reflected by an object 11, enter through opening 2 of the tubular means 1 and pass through the objective lens 4 to form an inverted infrared image 14 of the object 11 on the infrared-sensitive cathode 15 of the image converter 10. By means of the electron-optical focusing system (not shown) in the image converter 10, an upright visible image 16 is produced on the fluorescent screen 17 of the image converter 10. This visible image is observed by the human eye 18 through the ocular lens 5.

In operation of the daytime arrangement, illustrated in Fig. 3, visible rays 19 and 20 from the object 11 enter tubular means 1 through the opening 2 and form an inverted image 23 which is again inverted by the optical lens 22 to form an upright image 24, which is observed by the human eye 18 through the ocular lens 5.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An apparatus for viewing the image of an object, comprising, in combination, a support member having a recess; objective lens means arranged on said support member and having a focal plane in which is formed an image of the object; ocular lens means arranged on said support member along the optical axis of said objective lens means and having a focal plane spaced from said focal plane of said objective lens means; a plurality of mutually exchangeable tubular mounting means each capable of being arranged in said recess on said support member between said focal planes of said objective and ocular lens means for removal in a direction transverse to the optical axis of said lens means, one end of said mounting means when located in said recess being arranged substantially in said focal plane of said objective lens means and in light-tight contact with said objective lens means, the other end of said mounting means when located in said recess being arranged substantially in said focal plane of said ocular lens means and in light-tight contact with said ocular lens means, each of said lens means having gasket members to receive the ends of said mounting means; and image operating means secured in each of said respective mounting means between said focal planes of said objective and ocular lens means for removal with said mounting means, one of said image operating means being a converter responsive to the infrared spectrum of said image formed in said focal plane of said objective lens and comprising tube means having a screen in said focal plane of said ocular lens for producing a visible second image; and another one of said image operating means consisting of lens means for the visible spectrum.

2. An apparatus for viewing the image of an object, comprising, in combination, a support member having a recess; tubular objective lens means arranged on said support member and having a focal plane in which is formed an image of the object; tubular ocular lens means arranged on said support member and having a focal plane coaxially spaced from said focal plane of said objective lens means; and a plurality of mutually exchangeable tubular mounting means each capable of being arranged in said recess on said support member between said focal planes of said objective and ocular lens means for removal in a direction transverse to the axis of said lens means, one end of said mounting means when mounted being arranged substantially in said focal plane of said objective lens and the other end of said mounting means when mounted being arranged substantially in said focal plane of said ocular lens means, each of said mounting means having secured therein an image operating means between said focal planes of said objective and ocular lens means, one of said image operating means being a converter responsive to infrared radiation for producing a visible image, and another one of said image operating means consisting of lens means for the visible spectrum.

References Cited in the file of this patent

UNITED STATES PATENTS

| | | |
|---|---|---|
| 1,236,722 | Lange | Aug. 14, 1917 |
| 1,936,514 | Lengnick | Nov. 21, 1933 |
| 2,058,941 | Arnhym | Oct. 27, 1936 |
| 2,207,124 | Kollmorgen | July 9, 1940 |
| 2,237,943 | Lihotzky | Apr. 8, 1941 |
| 2,640,162 | Espenschied et al. | May 26, 1953 |
| 2,683,816 | Bouwers | July 13, 1954 |

FOREIGN PATENTS

| | | |
|---|---|---|
| 319 | Great Britain | 1905 |

OTHER REFERENCES

"Infrared Image Tube," Morton et al., Electronics, September 1946, vol. 19, pages 112–114.